United States Patent

Decoster et al.

[11] 3,801,150
[45] Apr. 2, 1974

[54] CAMPER-COMPACT BUS COMBINATION STRUCTURE AND METHOD OF ASSEMBLING SAME

[76] Inventors: Richard L. Decoster; Maureen H. Decoster, both of Box 147-DZ, RR 5,, Elkhart, Ind. 46514

[22] Filed: July 17, 1972

[21] Appl. No.: 272,499

[52] U.S. Cl. ........................... 296/23 R, 296/23 MC
[51] Int. Cl. ............................................... B60p 3/32
[58] Field of Search ...................... 296/23 R, 23 MC

[56] References Cited
UNITED STATES PATENTS
3,475,048  10/1969  McNamee ........................ 296/23 R
3,501,194  3/1970  Frank ............................... 296/23 R

*Primary Examiner*—Philip Goodman
*Attorney, Agent, or Firm*—Hobbs & Green

[57] ABSTRACT

A camper-compact bus combination structure in which the bus body, such as that used on a Volkswagen bus, is cut transversely at the rear of the driver's compartment and along the chassis to the engine compartment at the rear and upwardly therefrom to provide upstanding side members along and above the engine compartment. A camper is seated on the chassis and over the remnants of the body portion and includes a front panel with an opening corresponding generally to the opening at the rear of the driver's compartment so that the driver's compartment and the compartment in the camper form essentially a single living area. The camper extends outwardly from the remnants of the side walls of the body of the bus to the rear of the cab and preferably upwardly and over the cab. The method of cutting the body of the bus retains the frame, front and rear bumpers, engine compartment, wheel wells and taillights in their original condition and permits the camper to be secured in place in direct communication with the driver's compartment.

9 Claims, 8 Drawing Figures

CAMPER-COMPACT BUS COMBINATION STRUCTURE AND METHOD OF ASSEMBLING SAME

Compact buses such as the well known Volkswagen buses are often converted and fitted as campers or motor homes and contain a table, stove, refrigerator, folding bed and cupboards, and are used for living quarters for extended periods of time. Since the conventional compact bus is not sufficiently tall to permit an average adult to stand upright, the roofs or tops of the buses have often been altered by removing the center portion of the top and placing a cap over the top to give the compartment of the bus sufficient head room to permit a person to stand erect. This arrangement, however, has not been satisfactory in that the remainder of the living space is cramped and the head space is confined so that the use of the facilities in the compartment has been inconvenient in many instances. In the past, efforts to increase the size of the bus compartment in lateral directions have been hampered by the original sides of the bus and the inherent propensity to utilize most or all of the original body for the body of the camper. Further, in order to have a comfortable and safe driving compartment, it is desireable to retain at least the forward end of the body, including the front seats, door and windshield. These desirable original features and structure have created problems in modifying the buses, and the approaches to solving these problems have resulted in only slight increases in the compartment space and in the convenience in the use of the facilities therein. It is therefore one of the principal objects of the present invention to provide a combination camper and compact bus which retains the forward end of the bus body and increases the size of the compartment so that an average adult can conveniently move around and use the facilities therein while standing and walking erect.

Another object of the invention is to provide a camper-compact bus combination in which a substantial portion of the body structure and the structure of the camper are effectively integrated to form essentially a single vehicle structure having direct connection between the living and driving compartments, and which can include all the facilities of a conventional camper or motor home without creating cramped conditions in the living compartment.

Still another object of the invention is to provide a method of converting a compact bus to a vehicle structure of the motor home type, utilizing the bus chassis and driver compartment, and mounting the living compartment on the chassis, and joining it firmly with the portion remaining after removing the top and substantial parts of both side walls and rear of the original body of the bus.

Additional objects and advantages of the present invention will become apparent from the following description and accompanying drawings, wherein:

FIG. 8 is a cross-sectional view taken on line 8—8 of FIG. 4.

Figure 1:
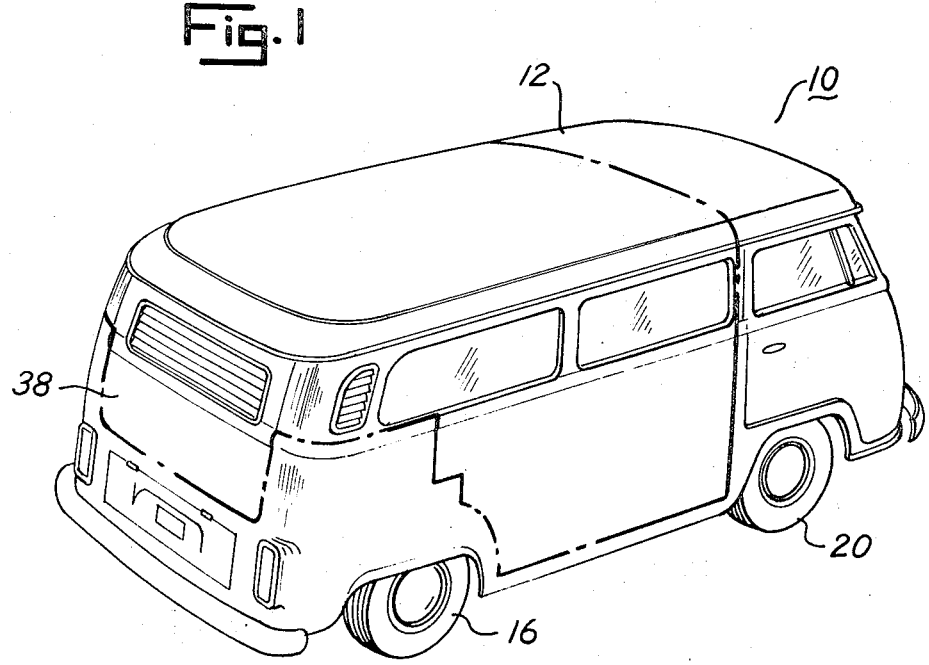
FIG. 1 is a perspective view of a compact bus such as a Volkswagen showing by dot and dash line the cut in removing a portion of the body from the bus.
Figure 2:
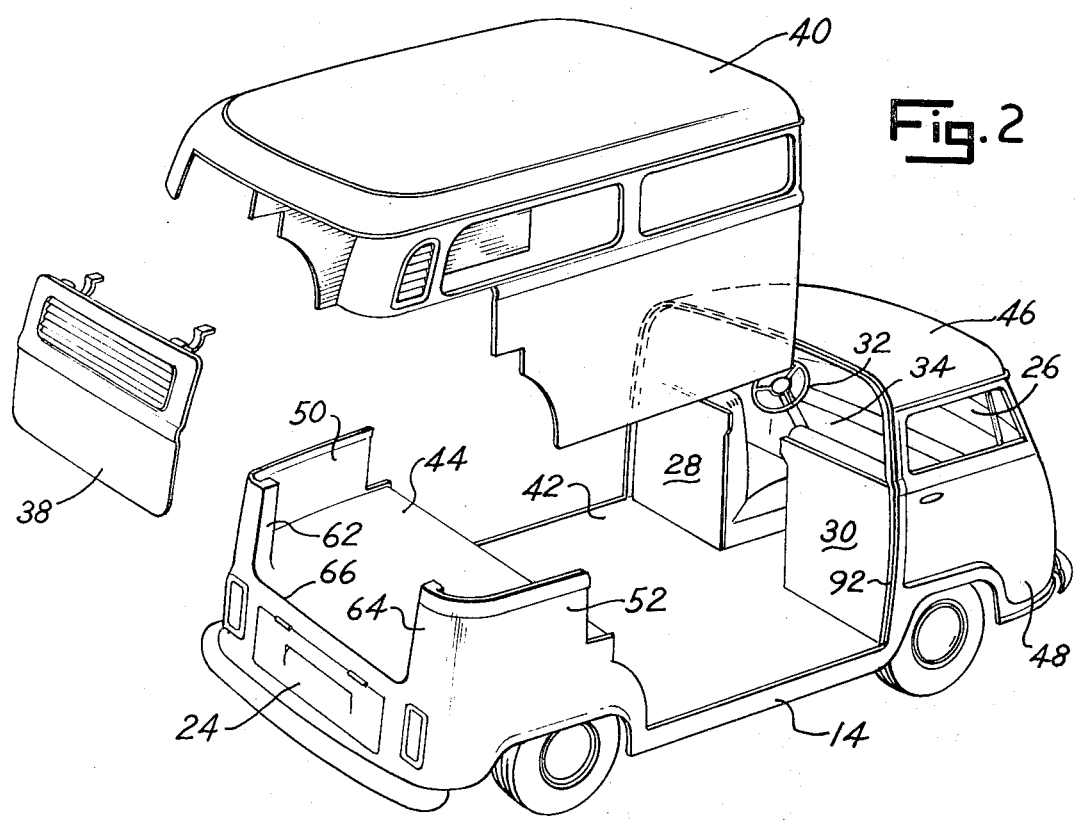
FIG. 2 is a perspective view illustrating the portion of the body of the bus removed in constructing the camper and compact bus combination.
Figure 3:
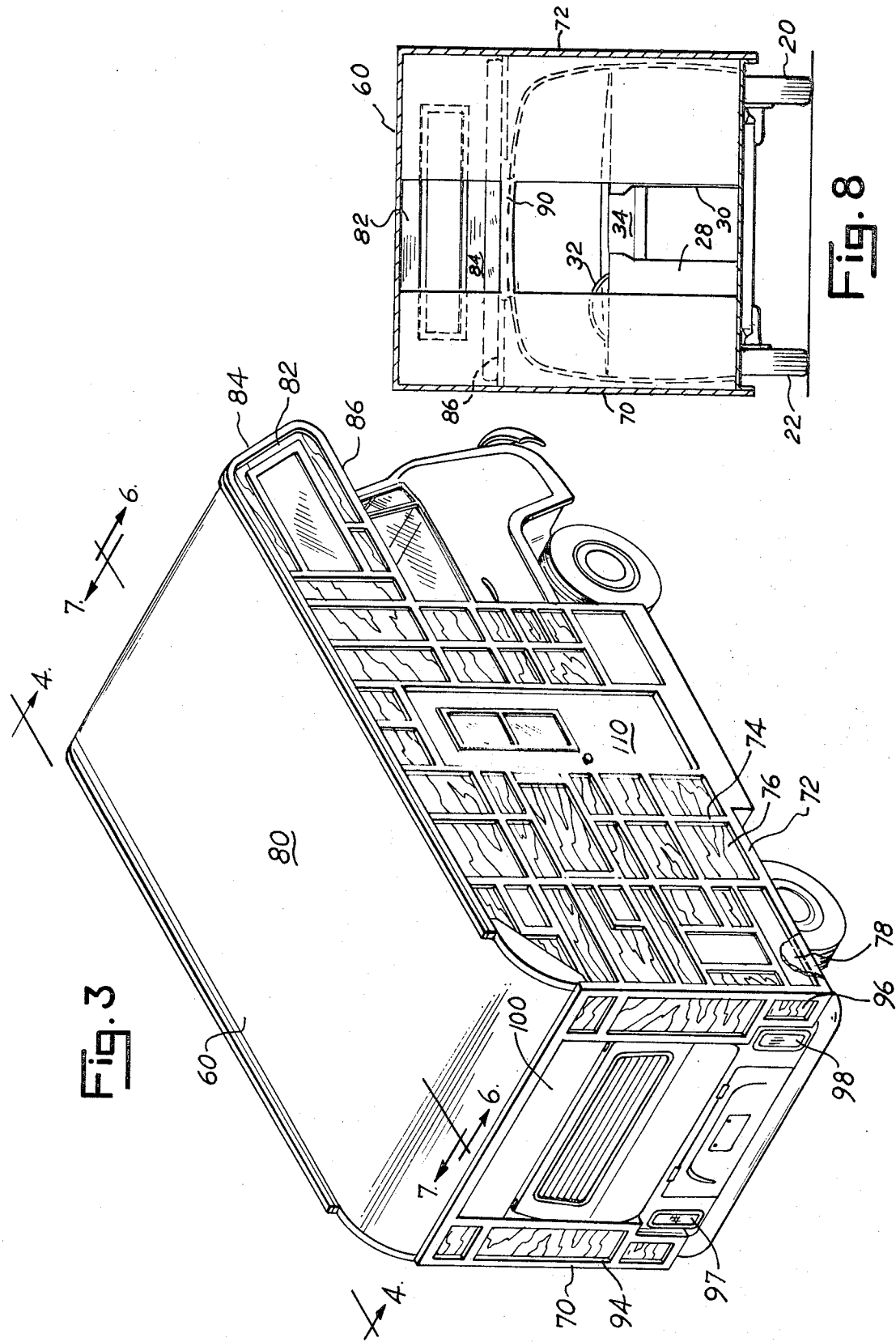
FIG. 3 is a perspective view of the camper mounted on the bus occupying the space formed by the removed portion of the body.
Figure 4:
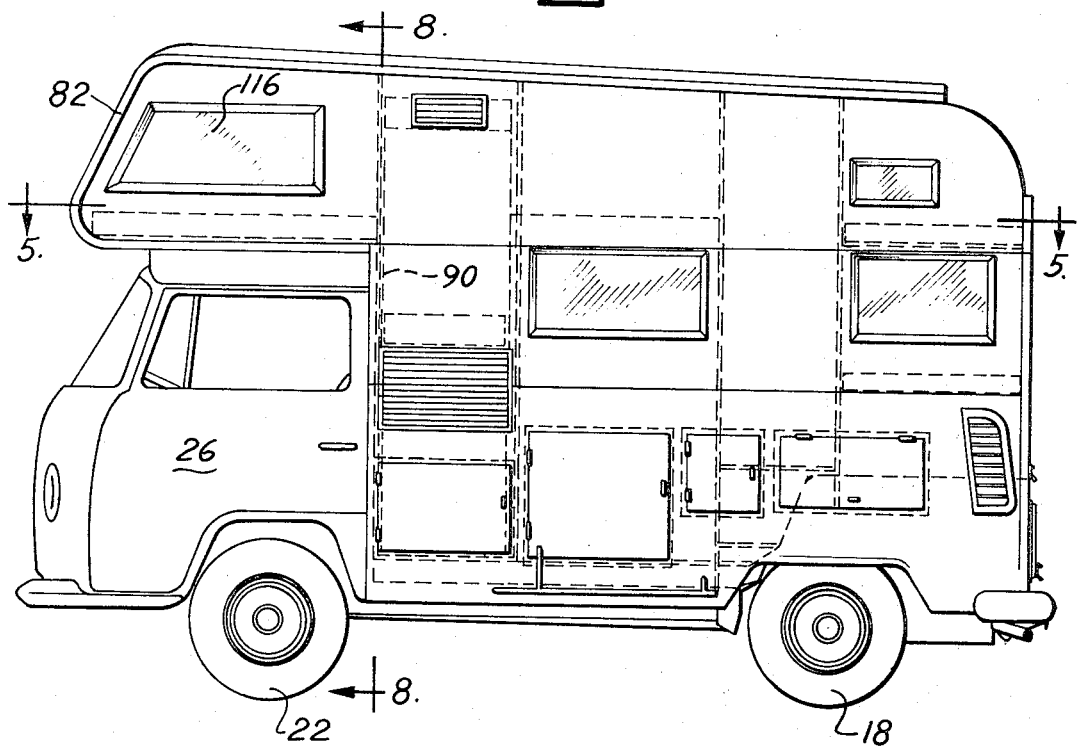
FIG. 4 is a side elevational view of the combination camper and bus structure, illustrating various facilities in the vehicle.
Figure 5:
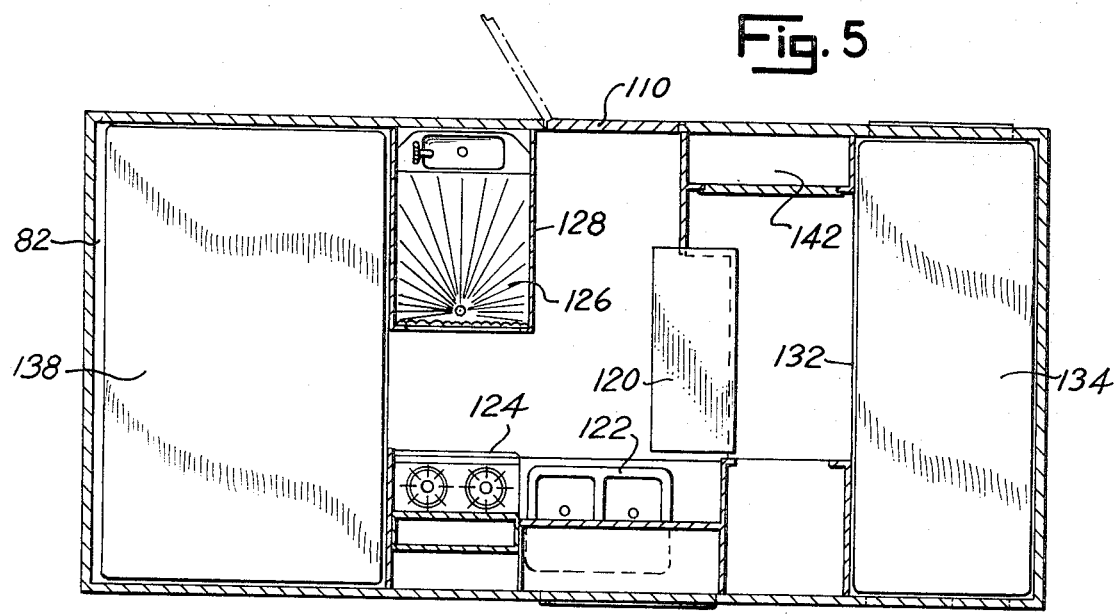
FIG. 5 is a floor plan view of the vehicle shown in FIG. 4, the section being taken on line 5—5 of the latter figure.
Figure 6:
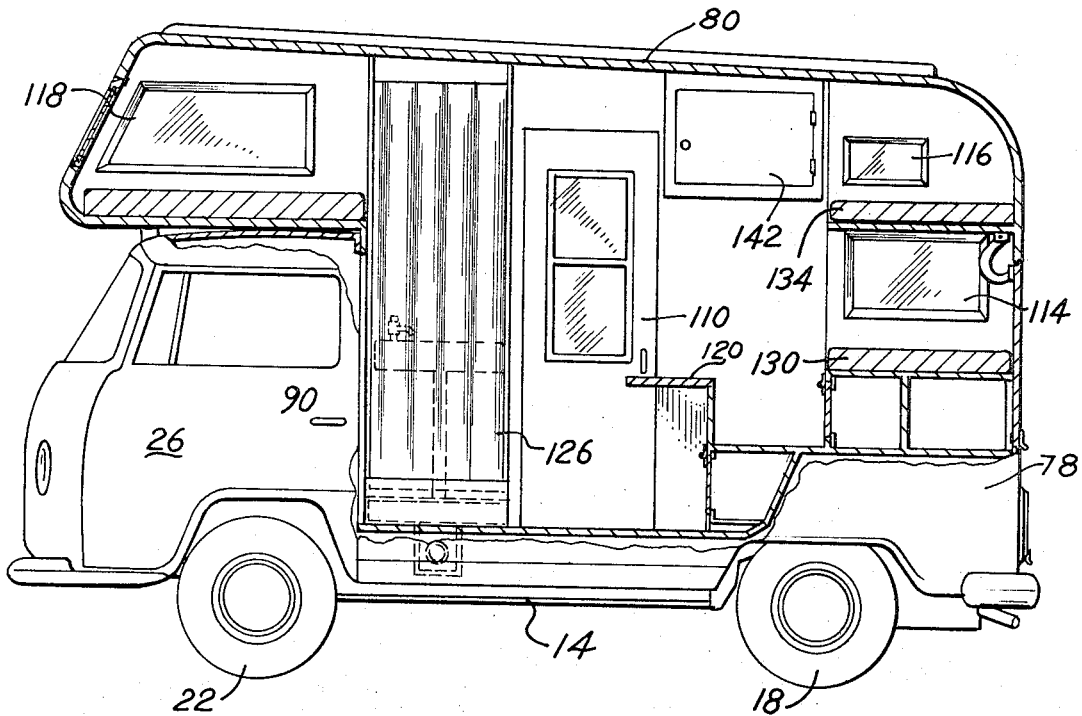
FIG. 6 is a vertical cross-sectional view of the vehicle illustrated in FIGS. 3, 4 and 5, the section being taken on line 6—6 of FIG. 3.
Figure 7:
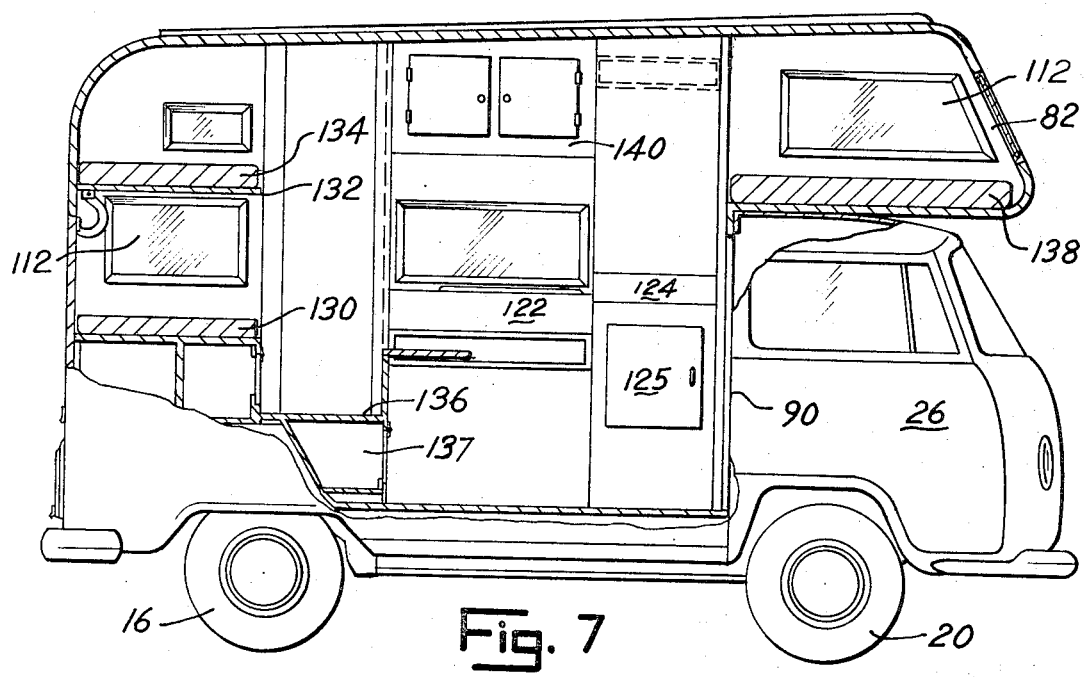
FIG. 7 is a vertical cross-sectional view of the camper shown in the preceding figures, the section being taken on line 7—7 of FIG. 3.

Referring more specifically to the drawings and to FIGS. 1 and 2 in particular, numeral 10 indicates generally a compact bus, such as a Volkswagen bus, having a body 12, and chassis 14 including rear wheels 16 and 18 and front wheel 20 and 22. The engine is in a compartment 24 at the rear of the body, and the driver's compartment or cab is indicated by numeral 26 and contains front seats 28 and 30, steering wheel 32 and dash or instrument panel 34. The body includes several windows and a main door not shown in the views, and a rear door 38 above the engine compartment 24. The present invention is directed primarily to a Volkswagen compact bus and is particularly applicable to the body design and structure thereof; however, it may be applicable to other types of compact buses and vans.

The first step in converting the compact bus to a camper or motor home is performed by cutting with a cutting torch or any other suitable means, on the line indicated by the dot and dash line in FIG. 1. When the body is cut in the manner shown in FIG. 1, a section designated by numeral 40 is lifted from the remainder of the body, thus leaving floor 42, platform 44, cab or front end portion 46 including door 48, and two upstanding side members 50 and 52 at the rear of the body. After door 38 is removed, body section 40 is discarded, and the door is used in the completed combination.

After the body section 40 has been removed from the bus, a camper structure 60 is installed on the chassis and secured in place to the rear of and over cab 46. It is seen from FIG. 2 that the body has been cut vertically immediately behind the driver's compartment or cab section 46, thus leaving the front portion fully intact and essentially the same as in the original bus. The upstanding side walls 50 and 52 extend above platform 44 and continue around the rear end of the lower portion of the body, forming inwardly extending flanges 62 and 64, the inner edges of which, along with the upper edge 66 above the engine compartment, form the lower portion of a door frame for door 38 in the final camper-bus combination.

The camper structure consists of two side walls 70 and 72 normally constructed of a frame work 74 of two-by-two members on which are mounted paneling 75 on the inner side and aluminum sheeting or other suitable external paneling 78 on the outside. The two sides 70 and 72 are joined at the upper edges by a top 80 which extends forwardly over the cab of the vehicle to form a compartment 82 having a front wall 84 and a floor or bottom 86. A front wall or partition 90 joined to the front edges of side walls 70 and 72 contains an opening 92 into cab 46, and is sealed around the rear edge of the wall of the cab to make the connection between the wall and the paneling of the cab waterproof and substantially air tight. The side walls 70 and 72 are sucured to the rear portion of bus body side walls 50 and 52 to retain them firmly in place on the bus chassis. In this construction the entire rear of the cab opens into and is in direct communication with the living compartment of the camper.

The rear wall of the camper structure includes two inwardly extending panel sections 94 and 96 projecting inwardly to substantially the inner edge of the door frame for door 38, and extending from the lower edge of top 80 to the engine compartment. The two sections are designed to expose the original lights 97 and 98 of the bus. The construction of the camper structure and the manner in which it is assembled on the chassis retain the essential operating parts of the bus intact so that there is little or no likelihood of causing any failures in the automobile mechanism or systems as a result of the installation of the camper structure.

The camper structure is preferably fabricated apart from the bus and is then installed bodily on the cutaway body and chassis of the bus. The rear door 38 of the bus is used for a rear door of the completed camper structure and is supported by hinges on a panel 100 forming a part of the rear wall of the camper structure. The camper is substantially wider than the original bus, and sides 70 and 72 extend downwardly but are spaced outwardly from the side wall members 50 and 52 and extend outwardly from the chassis. After the camper structure is seated in place on the chassis and the remnant of the body portion of the bus, it is bolted onto the chassis and cutaway portion so that it forms in effect an integral part of the vehicle.

The camper structure includes a door 110 and a number of windows, such as those illustrated at numerals 112, 114, 116 and 118. The arrangement of facilities in the camper may be any one of a variety of different plans, the one shown in the drawings merely being included for the purpose of illustrating a suitable arrangement and one which has been found to be particularly applicable to the type of structure forming the present invention.

In the drawings, the facilities consist of a table 120, sink 122, stove 124, refrigerator 125 and a shower and toilet combination 126 in a stall 128. The platform 44 is used for a bunk bed on which a mattress 130 is placed, and spaced above the platform is a second bunk bed 132 on which a mattress 134 is placed. A frame 136 extends outwardly from the lower portion of the platform and may be used as a seat and to provide storage space 137 therebeneath. The overhang over the cab of the vehicle is normally used for a bunk bed and contains a mattress 138; however, the area conveniently be used for storage. Various cupboards and closets such as those illustrated at numerals 140 and 142 may be built in, wherever convenient, without unduly restricting the living space.

In the fabrication and use of the present mini camper and compact bus combination, the body 12 of the bus is cut in the manner illustrated in FIGS. 1 and 2, and body section 40 removed therefrom. The camper structure, which has been fabricated with or without the fixtures, is placed on the chassis and over the remaining portion of the bed seen in FIG. 2. The camper is then secured by bolts or rivets to the bed and chassis, and front partition 90 is seated against the rear edges of the walls and top of the cab and is joined to and sealed around the edges, the rear edges of the walls of the cab defining a rear opening for the cab which may be partially closed by partition 90 and/or appurtenances of the vehicle such as a shower stall, range, closet and/or cupboards. When the camper has been installed in this manner, the entire living space and the driver's compartment are in direct communication with one another so that, in the use of the vehicle, the occupants can travel and communicate freely between the driver's compartment and the camper compartment, thus in effect rendering the two compartments one relatively large living area. The camper structure is sufficiently tall that normal adults can easily stand and walk erect from side to side and through door 110, and is sufficiently wide that a normal adult can lie full length in any one of the bunk beds cross-wise of the camper. Since all of the facilities normally required for daily living are incorporated in the camper, the camper-bus combination, which in effect is a motor home, can be readily used for transportation and parked and used for normal living.

One of the primary advantages of the present combination struxture is that the essential operating features of the compact bus, such as the driver's compartment, brakes, engine, and drive, are retained for proper and safe transportation, and the living quarters are sufficiently large that the occupants can live in a normal manner without being cramped for space or having their heads confined to a relatively narrow space at the center of the bus such as encountered in the buses having merely an elevated top structure.

While only one embodiment of the present invention has been described in detail herein, various changes and modifications may be made without departing from the scope of the invention.

We claim:

1. A camper-compact bus combination structure comprising a chassis, a vehicle body portion having upstanding side members at the rear, and a cab enclosing the driver's compartment and having two sides and a top joined to the sides forming a generally rectangular rear opening into the cab and a camper having a front partition with an opening therethrough and being connected to said cab around said rear opening, side walls spaced outwardly from the outer edges of said chassis and the remnants of said body and extending upwardly above said cab, a top connected to the upper edge of said side walls, front and rear walls connected to said top and side walls, and a transverse panel disposed between said upstanding side members at the rear and, along with said members, forming an engine compartment.

2. A camper-compact bus combination structure as defined in claim 1 in which said front partition is extended outwardly from the side walls of the cab.

3. A camper-compact bus combination structure as defined in claim 1 in which the two side walls of said camper embrace said upstanding side members and are spaced outwardly therefrom.

4. A camper-compact bus combination structure as defined in claim 1 in which the side walls and top of said camper project forwardly over the cab to form a forwardly extending compartment.

5. A camper-compact bus combination structure as defined in claim 3 in which an opening is provided in the rear of said camper and a door is hinged near the top thereof to swing outwardly to the rear from the opening.

6. A method of constructing a combination camper and compact bus having a rear mounted engine, a chassis and a body extending over the engine and having an engine compartment with a rear opening and a driver's compartment: comprising severing a portion of said body therefrom on a line extending across the body behind the driver's compartment, rearwardly near the bottom of the body and upwardly and rearwardly above the engine compartment; mounting a camper structure having a front partition with an opening therethrough on the remnants of said body and outwardly therefrom; securing said front panel to the rear edge of the body portion around said driver's compartment; securing said camper rigidly in place on said chassis; and closing the opening of the engine compartment with a door.

7. A method of constructing a combination camper and compact bus as defined in claim 6 in which said front partition is extended outwardly from the side walls of the cab.

8. A method of constructing a combination camper and compact bus as defined in claim 6 in which said front partition is sealed around said body around the driver's compartment.

9. A method of constructing a combination camper and compact bus as defined in claim 6 in which the method includes the step of closing the opening with the rear door of the compact bus.

* * * * *